(12) United States Patent
Balland Longeau et al.

(10) Patent No.: US 8,716,386 B2
(45) Date of Patent: May 6, 2014

(54) METHOD FOR PRODUCING POLYMERIC BALLS OR BEADS CONTAINING METAL ELEMENTS

(75) Inventors: Alexia Balland Longeau, Tours (FR); Louis Moreau, Le Petit Pressigny (FR); Christian Levassort, Tours (FR); Lyonel Guillot, Talant (FR)

(73) Assignee: Commissariat a l'Energie Atomique et aux Energies Alternative, Paris (FR)

( * ) Notice: Subject to any disclaimer, the term of this patent is extended or adjusted under 35 U.S.C. 154(b) by 69 days.

(21) Appl. No.: 13/516,225

(22) PCT Filed: Dec. 22, 2010

(86) PCT No.: PCT/EP2010/070516
§ 371 (c)(1),
(2), (4) Date: Nov. 30, 2012

(87) PCT Pub. No.: WO2011/076858
PCT Pub. Date: Jun. 30, 2011

(65) Prior Publication Data
US 2013/0072618 A1     Mar. 21, 2013

(30) Foreign Application Priority Data

Dec. 22, 2009 (FR) ..................................... 09 59383

(51) Int. Cl.
*B01J 13/02* (2006.01)
*B05D 7/00* (2006.01)
*C08K 3/08* (2006.01)
*C08K 3/10* (2006.01)
*C08L 33/14* (2006.01)

(52) U.S. Cl.
USPC ........... 524/413; 524/408; 524/433; 524/434; 524/436; 524/437; 427/213.3; 427/213.31

(58) Field of Classification Search
USPC ......... 524/403, 408, 433, 434, 436, 437, 413; 427/213.3, 213.31
See application file for complete search history.

(56) References Cited

U.S. PATENT DOCUMENTS

| | | | |
|---|---|---|---|
| 4,123,396 A | 10/1978 | Rembaum et al. | |
| 4,197,220 A | 4/1980 | Rembaum et al. | |
| 2013/0072618 A1* | 3/2013 | Balland Longeau et al. | 524/440 |

FOREIGN PATENT DOCUMENTS

| | | |
|---|---|---|
| DE | 43 39 635 A1 | 6/1995 |
| FR | 2 921 929 A1 | 4/2009 |
| WO | 2004/007767 A2 | 1/2004 |
| WO | WO 2011076858 A1 * | 6/2011 ............. C08L 33/14 |

OTHER PUBLICATIONS

G. Bayramoglu et al., "Immobilization of urease via adsorption onto L-histine-Ni(II) complexed poly(HEMA-MAH) microspheres: Preparation and characterization", Process Biochemistry, vol. 40, 2005, pp. 3505-3513.*
International Search Report and Written Opinion dated Feb. 9, 2011 of PCT/EP2010/070516—12 pages.
International Preliminary Examination Report dated Apr. 23, 2012 of PCT/EP2010/070516—22 pages.
Bayramoglu, G. et al., "Immobilization of urease via adsorption onto I-histidine-Ni(II) complexed poly (HEMA-MAH) microspheres: Preparation and characterization", Process Biochemistry, 2005, vol. 40, No. 11, pp. 3505-3513.
Uguzdogan, E. et al., "The use of polyethyleneglycolmethacry-co-vinylimidazole (PEGMA-co-VI) microspheres for the removal of nickel (II) and chromium (VI) ions", Journal of Hazardous Materials, 2009, vol. 177, No. 1-3, p. 119-125.
Uguzdogan, E. et al., "Preparation and characterization of polyethyleneglycolmethacrylate (PEGMA)-co-vinylimidazole (VI) microspheres to use in heavy metal removal", Journal of Hazardous Materials, 2009, vol. 162, No. 2-3, pp. 1073-1080.
Iemma et al, "Removal of metal ions from aqueous solution by chelating polymetric microspheres bearing phytic acid derivatives", European Polymer Journal, 2008, vol. 44, No. 4, p. 1183-1190.
Moreau, L. et al., "Recent advances in development of materials for laser target", Laser and Particle Beams, 2009, vol. 27, No. 4, p. 537-544.

* cited by examiner

*Primary Examiner* — Ling-Siu Choi
*Assistant Examiner* — Ronald Grinsted
(74) *Attorney, Agent, or Firm* — Knobbe, Martens, Olson & Bear, LLP

(57) ABSTRACT

A method for producing polymeric balls or polymeric beads doped with at least one metal element is provided. The method may comprise the following steps: a) a step for forming polymeric balls or beads by polymerization, in an organic phase comprising a polymerization initiator, of at least one ethylenic monomer comprising at least one chelating ligand of at least one metal element; and b) a step for putting said polymeric balls or beads in contact with a solution comprising at least one metal element.

22 Claims, 3 Drawing Sheets

METHOD FOR PRODUCING POLYMERIC BALLS OR BEADS CONTAINING METAL ELEMENTS

RELATED APPLICATIONS

This application is a U.S. National Phase of International Application No. PCT/EP2010/070516, filed Dec. 22, 2010, designating the U.S., and published in French as WO 2011/076858 on Jun. 30, 2011 which claims the benefit of French Patent Application No. 09 59383 filed Dec. 22, 2009.

TECHNICAL FIELD

The present invention relates to a method for producing optionally porous, polymeric balls or optionally porous, polymeric beads both doped with metal elements, which metal elements are bound to the constitutive material of said balls or beads through so-called coordination bonds, also called dative bonds, or through ionic bonds.

It is specified that by a ball is meant, in the foregoing and in the following, a sphere or a substantially spherical object having an internal cavity delimited by a polymeric wall giving the shape to said sphere or said object.

It is specified that by a bead is meant, in the foregoing and in the following, a solid sphere or a substantially spherical solid object.

The method of the invention in particular allows manufacturing of balls or beads, in particular microballs or microbeads (i.e., balls or beads having a diameter (the external diameter for the balls) from a few hundred micrometers to several millimeters) having a porous wall and the constitutive material of which comprises metal elements bound through coordination or ionic bonds to groups of this material having controlled geometrical characteristics.

The obtained balls or obtained beads find their application in the making of targets or target elements for studying laser/plasma interactions, in plasma physics and more generally for studying thermonuclear fusion by inertial confinement.

BACKGROUND

Polymeric balls or polymeric beads both doped with metal elements may be made and this up to now according to two major synthesis routes.

According to a first route, polymeric balls or beads synthesized beforehand are immersed in a solution comprising the metal element, said metal element diffusing by physical impregnation through the wall of the ball in order to occupy the central cavity of the microball or through the wall of the bead in order to occupy the porosity of the latter. At the end of this physical impregnation, balls are thus found having an excess of metal element in the central cavity relatively to the amount of metal element present in the wall or an excess of metal element in certain areas of the beads and with an impossibility of controlling the amount of this metal element inside said wall or said beads.

In order to remove the metal element excess in the central cavity of the balls, one solution consists of having the thereby doped balls undergo a washing step with a solvent capable of being exchanged with the one present in the central cavity and thereby discharging concomitantly the metal element present in said cavity. However, this washing step is not discriminating and will also remove a large portion or even the totality of the metal element present inside the wall of the balls.

The same problems are posed as regards the beads when the question is of discharging the excess metal element in certain porous areas of the beads.

The consequence is therefore that it is very difficult to proceed with doping of balls or beads synthesized beforehand with metal elements and with monitoring the doping level of the latter.

In order to overcome the aforementioned drawbacks, certain authors have explored a second synthesis route, as regards manufacturing of balls, which consists in a method comprising the following steps:

a step for machining half-shells in a foam block, the half-shells being capable from a geometrical point of view, of being joined together by adhesive bonding so as to form a ball;

a step for impregnating the half-shells with a solution comprising a metal salt;

a step for drying the thereby impregnated half-shells, by means of which the consequence is a deposit of metal salt in the constitutive polymer of the half-shells;

a step for adhesively bonding the half-shells in order to form a ball.

However, this synthesis route proves to be complex to apply and with it, balls having good sphericity may be obtained with difficulty.

Thus, from the routes for synthesizing doped balls or doped beads with metal elements of the prior art, one or several of the following drawbacks emerge:

for the first method explained above:

an inability to control the level of doping with metal elements in the constitutive walls of the balls or beads;

an accumulation of metal elements in the central cavity of the balls or in the porosity of the beads, for which the only removal route is by washing which is inevitably accompanied by removal of the metal element from the constitutive walls of the balls or beads; and for the second method explained above:

very complex manufacturing when the question is of manufacturing balls by machining half-shells and assembling the latter.

The inventors thus set their goal of proposing a method for producing doped polymeric balls or doped polymeric beads not having the aforementioned drawbacks.

DESCRIPTION OF CERTAIN INVENTIVE ASPECTS

Thus, the invention according to a first object relates to a method for producing polymeric balls or polymeric beads both doped with at least one metal element, comprising the following steps:

a) a step for forming polymeric balls or beads by polymerization, in an organic phase comprising a polymerization initiator, of at least one ethylenic monomer comprising at least one chelating ligand of at least one metal element;

b) a step for putting said polymeric balls or beads in contact with a solution comprising at least one metal element.

Before giving more details in the description of this invention, we specify the following definitions.

By ethylenic monomer comprising at least one chelating ligand of at least one metal element, is conventionally meant a monomer bearing a double carbon-carbon bond comprising at least one pendant group capable of complexing at least one metal element, which means in other words that the metal element is capable of binding to said pendant group through a coordination bond by sharing a free doublet or through an ionic bond by sharing a negative charge borne by said pendant group with the metal element to be attached.

By metal element, is conventionally meant an element belonging to the category of alkaline elements, earth alkaline elements, transition elements, lanthanide elements, actinide elements or elements selected from Al, Ga, Ge, In, Sn, Sb, Tl, Pb, Bi and Po.

This innovative method for producing polymeric balls or polymeric beads both doped with metal elements results in the following advantages:

- it allows incorporation into the walls of the balls and into the beads, of a wide diversity of metal elements, because the bond between the metal elements and the constitutive polymeric material of the walls of the balls and of the beads is effected by a simple coordination bond or ionic bond by means of the selection of the aforementioned monomer;
- it allows introduction of a determined level of metal element, said level may be adjusted by acting on the amount of aforementioned monomers set into play during the polymerization step;
- it allows specific localization of the metal elements in the wall of the balls or in the beads, by distributing these elements homogeneously or per area by acting on the distribution of the metal (for example, by acting on the contact time or the immersion depth in the metal solution);
- it allows exclusive localization of the metal elements in the wall of the balls and not in the central cavity and in determined areas of the beads by localization of the aforementioned monomers, the central cavity of the balls being able to be cleared of possibly present metal elements by washing operations which will not affect the amount of metal elements in the walls of the balls and the determined areas of the beads because the latter are bound in a stable way through coordination and/or ionic bonds by means of the aforementioned monomers;
- it is easily reproducible, notably as regards the level of metal elements present in the walls of the balls or in the relevant areas of the beads because this level is exclusively related to the amount of polymerized specific monomers for entering the constitution of the walls of the balls and of the determined areas of the beads.

As mentioned above, the method of the invention first comprises a step for forming polymeric balls or polymeric beads by polymerization, in an organic phase comprising at least one polymerization initiator, of at least one ethylenic monomer comprising at least one chelating ligand of at least one metal element.

According to the invention, the monomers including groups which may form chelating ligands, are advantageously monomers including at least one group bearing a free doublet, in particular an amine group, and/or at least one negatively charged group, in particular a carboxylate group. Advantageous monomers may comprise both at least one amine group and at least one carboxylate group, both of these types of groups may be derived from an amino acid remainder, the advantage of such monomers being that they allow binding of the quasi-totality of the metal elements of the Periodic Table.

More specifically, monomers which may be used in the method of the invention, may fit the following formula (I):

wherein:

R represents a group selected from the groups of the following formulae:

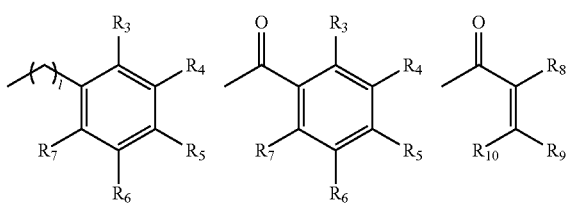

$R_1$ and $R_2$ represent independently, H, an alkyl group, an aryl group or a group of the following formulae:

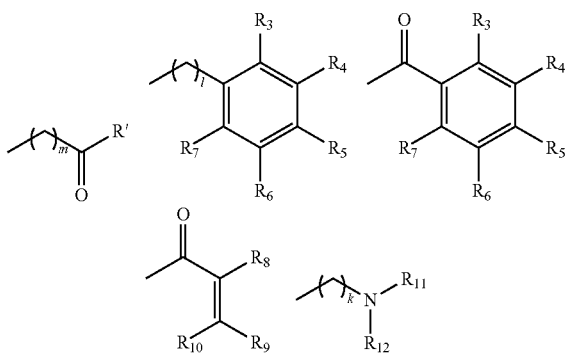

$R_{11}$ and $R_{12}$ independently corresponding to groups fitting the same definition as $R_1$ and $R_2$ given above;

R' is an $OR_{13}$ or amine group;

$R_3$, $R_4$, $R_5$, $R_6$, $R_7$, independently represent H, an ethylenic group, an alkyl group, an aryl group, an —O-aryl group, a —O-alkyl group, an acyl group, an alkylaryl group or a halogen atom, said alkyl, aryl, alkylaryl, —O-aryl, —O-alkyl groups being optionally perfluorinated, wherein one or more oxygen, nitrogen, sulfur and/or selenium atoms may be inserted into said groups, provided that at least one of the $R_3$, $R_4$, $R_5$, $R_6$, $R_7$ represents an ethylenic group;

$R_8$, $R_9$ and $R_{10}$ independently represent H, an ethylenic group, an alkyl group, an aryl group, an —O-aryl group, an —O-alkyl group, an acyl group, an alkylaryl group or a halogen atom, said alkyl, aryl, alkylaryl, —O-aryl, —O-alkyl groups being optionally perfluorinated, wherein one or more oxygen, nitrogen, sulfur and/or selenium atoms may be inserted into said groups;

$R_{13}$ represents H, a metal, such as an alkaline metal, an alkyl group, an aryl group, an acyl group or an alkylaryl group, said alkyl, aryl, alkylaryl groups being optionally perfluorinated and wherein one or more oxygen, sulfur and/or selenium atoms may be inserted into said groups;

k, l and m are integers ranging from 0 to 20;

and salts thereof.

Before giving more details in the description of the aforementioned monomers, we propose the following definitions.

By an alkyl group is generally meant, in the foregoing and in the following, a linear or branched alkyl group comprising from 1 to 20 carbon atoms or a cyclic alkyl group comprising from 3 to 20 carbon atoms. As examples, mention may be made of the methyl, ethyl, n-propyl, i-propyl, n-butyl, n-dodecanyl, i-butyl, t-butyl, cyclopropyl, cyclohexyl group.

By an aryl group is generally meant, in the foregoing and in the following, an aryl group comprising from 6 to 20 carbon atoms. As examples, mention may be made of the benzyl, naphthyl, biphenyl group.

By an alkylaryl group, is generally meant, in the foregoing and in the following, an aryl group with the same definition as the one given above, said group being substituted with at least one alkyl group with a definition identical with the one given above.

By an —O-alkyl, —O-aryl group, is meant an alkyl group or an aryl group, fitting the same definition as the one given above, the alkyl or aryl group being, in this case, bound to another portion of the monomer via an oxygen atom.

By a perfluorinated group is meant a group for which all the hydrogen atoms are substituted with fluorine atoms.

When it is specified that one or more oxygen, nitrogen, sulfur and/or selenium atoms may be inserted into said groups (i.e. alkyl, aryl, alkylaryl, —O-aryl, —O-alkyl groups), this means in other words that a carbon atom is replaced with a —O—, —S—, —N— or —Se— group.

By ethylenic group is meant a carbonaceous group comprising two carbon atoms bound through a double bond, this group being polymerizable via a radical route. A particular ethylenic group is a vinyl $CH_2=CH-$, (alkyl)acrylate group, such as a methacrylate group.

By acyl group is meant a —CO-alkyl group, the alkyl group fitting the same definition as the one given above.

By salt, are meant compounds of an ionic structure. For example, mention may be made of metal carboxylate salts, when R' corresponds to $OR_{13}$ with $R_{13}$ being a metal. In this scenario, by metal, is conventionally meant a monovalent metal, such as an alkaline metal, like Na, K.

By metal element, is meant for example an alkaline metal, an earth alkaline metal, a transition metal, a lanthanide, an actinide as well as the Al, Ga, Ge, In, Sn, Sb, Tl, Pb, Bi and Po elements.

In particular, the metal element is advantageously a lanthanide, such as ytterbium.

It is specified that the indexes k, l, m represent the number of recurrences of the unit taken between brackets, this number may range from 0 to 20.

Particular monomers may be those for which is a group of formula:

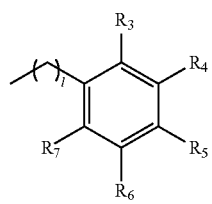

and at least one of $R^1$ and $R^2$ is a group of formula:

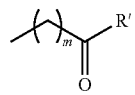

$R_3$ to $R_7$, R', l and m having the same meanings as those explained above, always provided that at least one of $R_3$ to $R_7$ represents an ethylenic group.

More particularly, monomers compliant with the definition given above, are monomers for which R is a group of formula:

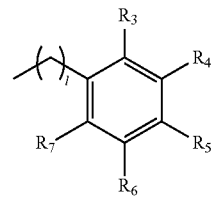

$R_1$ is a group of formula:

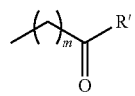

and $R_2$ is a hydrogen atom, l and m, $R_3$ to $R_7$ and R' having the same meaning as those given above, provided that at least one of $R_3$ to $R_7$ represents an ethylenic group. In particular, l and m may be equal to 1.

A particular monomer of this type fits the following formula (II):

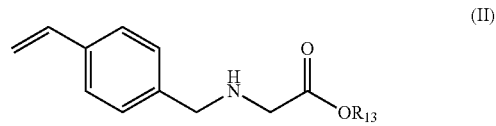

(II)

$R_{13}$ in particular representing H, a metal such as an alkaline metal (like Na, K) or an alkyl group, such as an ethyl group.

Another group of monomers falling under the definition of the monomers of formula (I) corresponds to monomers for which R is a group of formula:

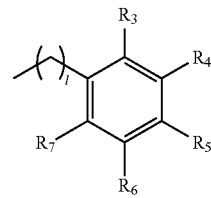

$R_1$ is a group of formula:

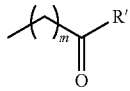

and $R_2$ is a group of formula:

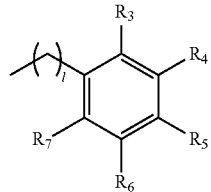

l and m, $R_3$ to $R_7$ and R' having the same meanings as those given above, provided that at least one of $R_3$ to $R_7$ represents an ethylenic group. In particular l and m may be equal to 1.

A particular monomer of this type fits the following formula (III):

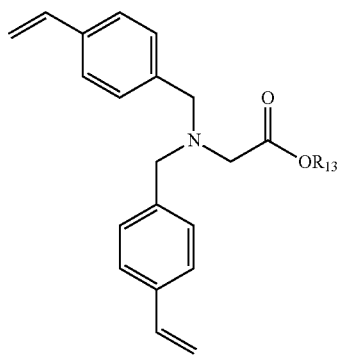

(III)

$R_{13}$ in particular representing H, a metal (such as an alkaline metal like Na, K) or an alkyl group, such as an ethyl group.

Other monomers which may used advantageously in the method of the invention, may be monomers including a cyclic amine comprising at least two nitrogen atoms.

Particular monomers of this type fit the following formula (IV):

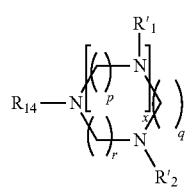

(IV)

wherein:

$R_{14}$ represents a group selected from the groups of the following formulae:

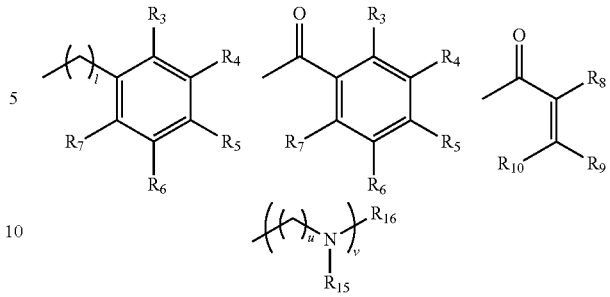

$R'_1$ and $R'_2$ independently represent an alkyl group, an aryl group or a group of the following formulae:

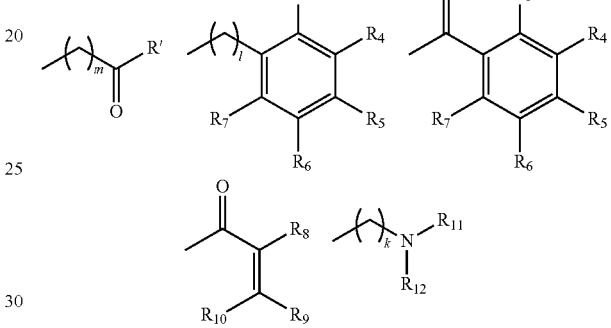

$R_{11}$ and $R_{12}$ independently corresponding to groups fitting the same definition as $R'_1$ and $R'_2$ given above;

R' is an $OR_{13}$ or amine group;

$R_3$, $R_4$, $R_5$, $R_6$ and $R_7$ independently represent H, an ethylenic group, an alkyl group, an aryl group, an —O-aryl group, an —O-alkyl group, an acyl group, an alkylaryl group or a halogen atom, said alkyl, aryl, alkylaryl, —O-aryl, —O-alkyl groups being optionally perfluorinated, wherein one or more oxygen, nitrogen, sulfur and/or selenium atoms may be inserted into said groups, provided that at least one of $R_3$, $R_4$, $R_5$, $R_6$, $R_7$ represents an ethylenic group;

$R_6$, $R_9$ and $R_{10}$ represent independently H, an ethylenic group, an alkyl group, an aryl group, an —O-aryl group, an —O-alkyl group, an acyl group, an alkylaryl group or a halogen atom, said alkyl, aryl, alkylaryl, —O-aryl, —O-alkyl groups being optionally perfluorinated, wherein one or more oxygen, nitrogen, sulfur and/or selenium atoms may be inserted into said groups;

$R_{15}$ represents a group of the following formulae:

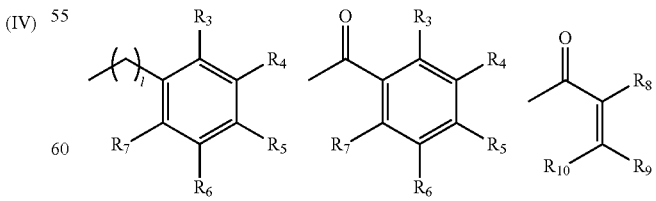

$R_3$ to $R_{10}$ being as defined above;

$R_{13}$ represents H, a metal, an alkyl group, an aryl group, an acyl group or an alkylaryl group, said alkyl, aryl, alkylaryl groups being optionally perfluorinated and wherein one or more oxygen, sulfur and/or selenium atoms may be inserted into said groups;

$R_{16}$ represents a group of formula:

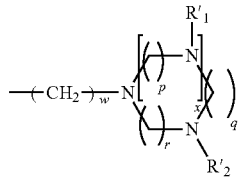

$R'_1$ and $R'_2$ being as defined above;

k, l, m, u, p, q, r, x and w are integers ranging from 0 to 20, v is an integer ranging from 1 to 20, provided that, when x is equal to 0, (r+q) is at least equal to 2, and when x is equal to 1, at least one of p, q, r is different from 0.

It is specified that p, q, r, x, k, l, m, u, v and w correspond to the number of recurrences of the unit taken between brackets (for p, q, r, k, l, m, u, v and w) or between square brackets (for x).

Advantageously, monomers of interest are monomers for which $R_{14}$ represents a group of the following formula:

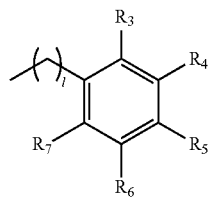

and at least one of $R'_1$ and $R'_2$ represents

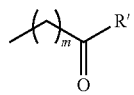

$R_3$ to $R_7$, R', l and m meet the same definition as the one given above, p, q, r and x being advantageously, at least equal to 1, always provided that at least one of $R_3$ to $R_7$ represents an ethylenic group.

More particularly, monomers complying with the definition given above, are monomers for which $R_{14}$ is a group of formula:

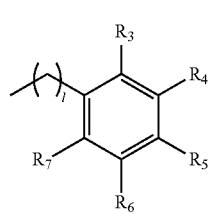

$R'_1$ and $R'_2$ represents a group of formula:

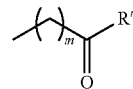

$R_3$ to $R_7$, R', l and m fitting the same definition as the one given above, p, q, r and x being advantageously at least equal to 1, always provided that at least one of $R_3$ to $R_7$ represents an ethylenic group. In particular, l and m may be integers equal to 1 and p, q, r and x may be integers equal to 2.

A particular monomer fitting the definition above is a monomer fitting the following formula (V):

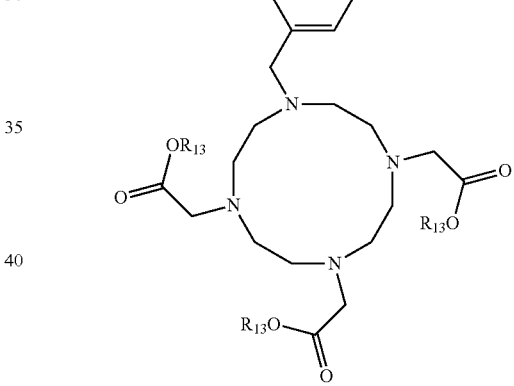

$R_{13}$ in particular representing H, an alkyl group, such as an ethyl group, or a metal.

Thus, for the monomer of formula (V), $R_{14}$ corresponds to a group of formula:

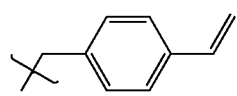

while $R'_1$ and $R'_2$ correspond to a group of formula —$CH_2$— $COOR_{13}$, and p, q, r and x are integers equal to 2.

Other monomers complying with the definition given above are monomers for which $R_{14}$, $R'_1$ and $R'_2$ fit the following formula:

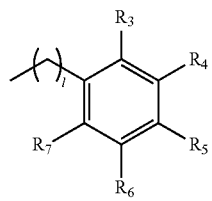

$R_3$ to $R_7$, l fitting the same definition as the one given above, p, q, r and x being at least advantageously at least equal to 1, always provided that at least one of $R_3$ to $R_7$ represents an ethylenic group. In particular, l may be an integer equal to 1 and p, q, r and x may be integers equal to 2.

A particular monomer fitting the definition given above is a monomer fitting the following formula:

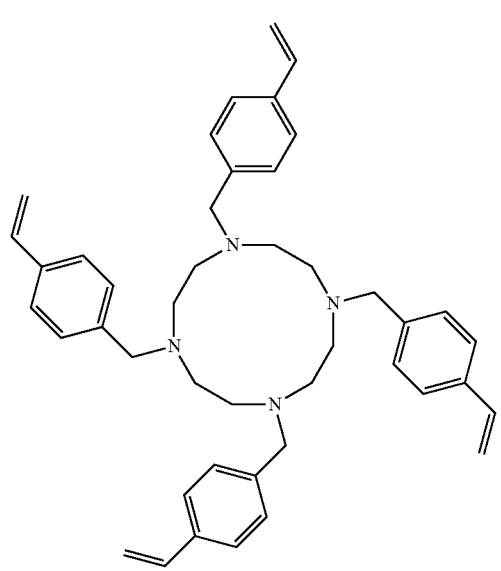

Advantageously, $R_{14}$ may also represent a group of formula:

and at least one of $R'_1$ and $R'_2$ represents:

$R_{15}$, $R_{16}$, R', m, u and v fitting the same definitions as the one given above, and p, q, r and x being advantageously at least equal to 1.

It is specified that when $R_{14}$ corresponds to a group of formula:

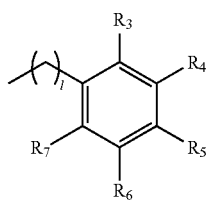

the monomers may be represented by the following general formula:

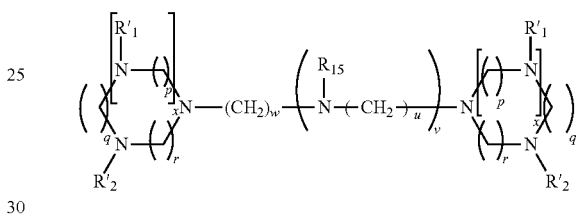

A group of particular monomers falling under the definition given above corresponds to those for which $R_{15}$ corresponds to a group of formula:

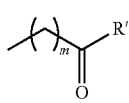

l, and $R_3$ to $R_7$ fitting the same definition as the one given above, provided that at least one of $R_3$ to $R_7$ represents an ethylenic group, and the groups $R'_1$ and $R'_2$ represent a group of formula:

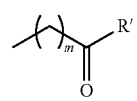

with m and R' fitting the same definitions as those given above, p, q, r and x being advantageously at least equal to 1. In particular p, q, r, x u, v and w represent for example an integer equal to 2.

A particular monomer falling under the previous definition fits the following formula (VI):

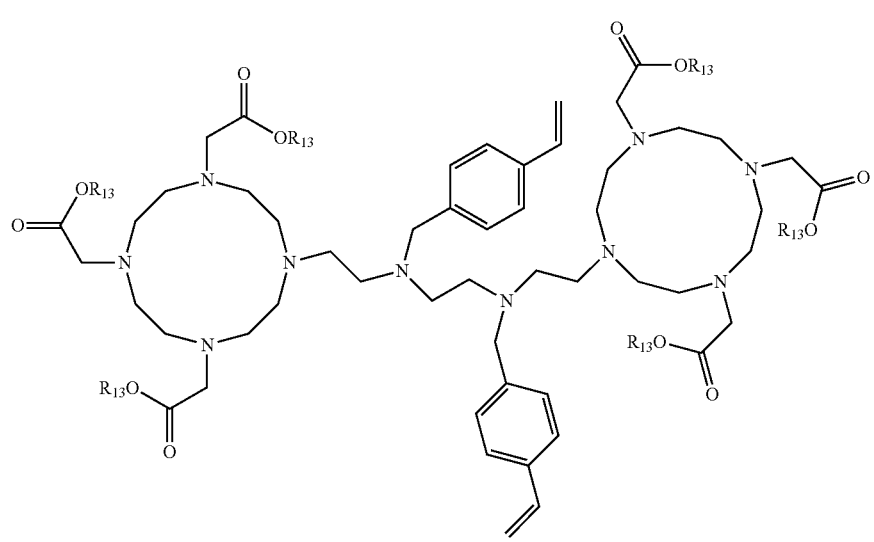

(VI)

$R_{13}$ in particular representing H, a metal, or an alkyl group, such as an ethyl group, and optional salts thereof.

Thus, for this monomer of formula (VI), the $R_{15}$ represent a group of formula:

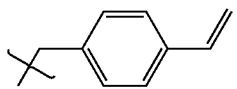

while $R'_1$ and $R'_2$ correspond to a group of formula $-CH_2-COOR_{13}$, and p, q, r, x, u, v and w are integers equal to 2.

Finally, other monomers which may be used, may be ethylenic monomers comprising at least one heterocyclic aromatic group, such as the vinylimidazole monomer fitting the following formula:

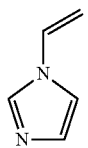

In addition to the aforementioned monomers, the organic phase may comprise one or more comonomers, said comonomers being generally different from the aforementioned monomers.

These comonomers may be selected from styrenic monomers or acrylate monomers.

Advantageously, the comonomers comprise at least two ethylenic groups thereby ensuring a role of cross-linking agent. The thereby obtained materials have good mechanical strength.

Comonomers which may be used, may be styrenic monomers of the following formula (VII):

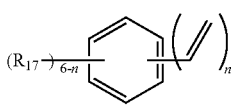

(VII)

wherein the (6-n) $R_{17}$, either identical or different, represent a hydrogen atom, an alkyl group, an aryl group, an —O-aryl group, an —O-alkyl group, an acyl group, an alkylaryl group or a halogen atom, said alkyl, aryl, alkylaryl, —O-aryl, —O-alkyl groups being optionally perfluorinated and n is an integer ranging from 1 to 3, preferably n being equal to 2.

In particular, a suitable comonomer may be divinylbenzene, in particular 1,4-divinylbenzene.

Comonomers which may be used, may also be acrylic compounds of the following formula (VIII):

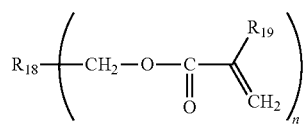

(VIII)

wherein $R_{18}$ represents an alkyl group, $R_{19}$ represents H or an alkyl group and n is an integer ranging from 1 to 3.

In particular, a suitable comonomer of this type may be trimethylolpropane triacrylate (known under the acronym of TMPTA) of the following formula:

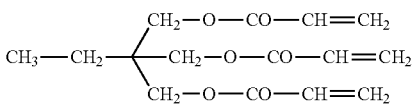

In addition, the organic phase comprises at least one polymerization initiator, such as a radical initiator conventionally selected from peroxide compounds, azonitriles (such as 2,2'-azobisisobutyro-nitrile (known under the acronym of AiBN), 2,2'-azodi(2,4-dimethyl-4-methoxyvaleronitrile) (also designated as V70), azoesters, azoamides.

The initiator may be introduced into the polymerization medium in variable amounts, for example in amounts which may range from 0 to 50% by weight, based on the total mass of the monomers set into play.

The organic phase may further comprise a porogenic solvent, which may be a polar, apolar organic solvent and may be selected from ether solvents (such as tetrahydrofurane), dimethylsulfoxide, phthalate solvents (such as dimethyl phthalate, dibutyl phthalate) alcoholic solvents (such as methanol, ethanol), aromatic solvents (such as toluene, fluorobenzene), ketone solvents.

Finally, the organic phase may comprise one or more surfactants, such as quaternary ammoniums, phospholipids, SPAN 80®.

In particular, step a) may be applied in the presence of a monomer of the aforementioned formula (III), of divinylbenzene and styrene.

According to a particular embodiment, step a) may be applied by the succession of the following operations:
  forming liquid beads with an organic phase or liquid balls by encapsulation of a first aqueous phase $W_1$ in an organic phase, this organic phase comprising at least one ethylenic monomer comprising at least one chelating ligand of at least one metal element and at least one polymerization initiator;
  emulsifying in a second aqueous phase $W_2$ the thereby formed balls or thereby formed beads;
  polymerizing the constitutive monomer(s) of the organic phase, by means of which polymeric balls or polymeric beads are obtained.

Practically, the liquid balls or liquid beads may be formed at the outlet of an injection system. As regards the formation of liquid balls, the injection system may comprise a first inlet in the form of a capillary for supplying the organic phase and a second inlet in the form of a capillary for supplying the aqueous phase $W_1$, both of these capillaries joining together at an outlet orifice where the liquid ball is formed.

The thereby formed balls or the thereby formed liquid beads are then <<picked up>> at the outlet orifice of the injection system by a second aqueous phase $W_2$, in which said balls or said beads will be found as an emulsion as stipulated by the suspension step as mentioned above.

In order to ensure good concentricity of the formed liquid balls, it is preferable that the density of the organic phase be greater than the density of the aqueous phase $W_1$.

Further in order to ensure the strength of the emulsion formed by putting an aqueous phase $W_2$ in contact with the formed balls or the formed beads during the formation step, it is preferable that the density of the aqueous phase $W_2$ be greater than the apparent density of the balls formed or beads formed during the formation step, i.e., in the case of the making of balls, the density of the whole formed by the organic phase and the aqueous phase $W_1$, for example, the density of the aqueous phase $W_2$ being at most greater by 1% than the apparent density of the formed balls.

The constituents of the aqueous phase $W_2$, of the organic phase and in the case of the formation of the balls, of the aqueous phase $W_1$, as well as their respective proportions will therefore be selected accordingly.

It is understood that the organic phase fits the same definition as given above for the description of step a).

The step for polymerization of the monomers present in the aforementioned organic phase may be achieved by heating to a temperature ranging from 40 to 100° C.

Once polymerization has been carried out, the formed balls or the formed beads may be isolated by filtration before being subject to step b).

Before polymerization and during the application of the latter, the monomer(s) comprising at least one chelating ligand of a metal element may be protected by a protective group, which may have the function of making said monomers soluble in the organic phase. In this case, it is necessary, before proceeding with the application of step b), to proceed with deprotection of the ligand so as to make it functional for step b). This deprotection step may consist of putting the polymerized balls or the polymerized beads in contact with a chemical deprotection reagent or further, of submitting it to a physical stimulus, for example to irradiation, when the protective group is cleavable by such irradiation.

Step b) of the method consists of putting the thereby polymerized balls or the thereby polymerized beads in contact with a solution comprising at least one metal element, which metal element may appear as a salt or a complex of a metal element.

The solution may consist in an organic solvent or a mixture of organic solvents in which a salt or a metal complex of the metal element to be complexed is solubilized with the polymeric material making up the walls of the balls or of the beads.

As examples of a metal salt or complex of a metal element, mention may be made of chlorides, bromides, fluorides, iodides, iodates, nitrates, sulfates, sulfonates, sulfites, nitrites, phosphates, phosphites, cyanides, azides, hydroxyls, chlorates, perchlorates, acetates, trifluoromethane sulfonates, trifluoroacetates, trichloroacetates, alkoxides, acetylacetonates, cyclopentadienyls, metal alkynides.

From a practical point of view, the contacting step b) may consist of immersing the polymerized balls or the polymerized beads in a solution comprising a salt or complex of a metal element for a suitable time in order to impregnate the polymerized balls or the polymerized beads and to allow the metal elements to be complexed with the polymeric material making up these balls or beads.

After this step b), the method of the invention may comprise a step for washing the thereby doped balls or thereby doped beads, so as to remove the stagnant solution comprising a metal element salt or complex in the central cavity of the balls or in the pores of the beads. This washing step may consist of putting the doped balls or doped beads in contact with a solvent which will be exchanged with the solvent comprising the metal element salt or complex. This washing step may be renewed once or several times.

Unlike the embodiments of the prior art, wherein the washing step was accompanied by leaching of metal elements present in the wall of the balls or in the beads, the metal elements complexed with the constitutive polymeric material of the walls of the balls made with the method of the invention or of the beads made with the metal of the invention are not affected by this step, since these elements are bound on the material via strong bonds: coordination bonds or ionic bonds.

Finally, the method may comprise, after step b) and the optional washing step, a step for drying the doped balls or doped beads. This drying step may consist of submitting said balls or said beads to freeze drying or to drying with supercritical carbon dioxide $CO_2$.

The method of the invention may be applied in a device specially designed for applying a method as defined earlier, comprising:
  an injection system including one or several inlets for supplying it with organic phase and optionally with an aqueous phase $W_1$, and an outlet orifice for forming liquid balls or liquid beads;
  a closed chamber in which is accommodated the outlet orifice of the injection system, this chamber including one or several inlets for supplying the aqueous phase $W_2$ and an outlet for discharging out of the chamber the emulsion resulting from the suspending of liquid balls or liquid beads in this aqueous phase $W_2$;

means for receiving the formed emulsion into said closed chamber.

The formed balls or beads according to the method of the invention appear in the form of objects in polymeric foam, which may have a specific gravity ranging from 10 to 250 mg·cm$^{-3}$ and may be used for forming targets or elements of targets for carrying out inertial confinement experiments.

The invention will now be described in the light of an exemplary embodiment of the method according to the invention, this example being provided as an illustration of the invention and by no means being a limitation thereof.

DETAILED DISCUSSION OF CERTAIN ILLUSTRATIVE EMBODIMENTS

Example

This example illustrates the production of foam microballs doped with ytterbium from a polymerizable chelating ligand of the following formula:

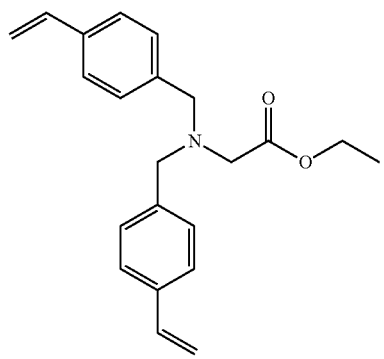 [SMILES: C=Cc1ccc(CN(CC(=O)OCC)Cc2ccc(C=C)cc2)cc1]

by the three-phase injection method.

The organic phase comprises the following elements:
two polymerization initiators: 62 mg of azoisobutyronitrile (AiBN) and 62 mg of 2,2'-azodi(2,4-dimethyl-4-methoxyvaleronitrile);
118 mg of SPAN® 80;
a mixture of the following comonomers: 17.5 mg of styrene, 332.5 mg of divinylbenzene (DVB) and 900 mg of a chelating ligand of the aforementioned formula;
10.43 g of dibutyl phthalate (DBP).

The organic phase is stirred until complete dissolution of the different initiators and until a homogeneous phase is obtained. The latter is then degassed under nitrogen (or under argon).

In order to avoid any degradation of the system during the polymerization (such as coalescence, molecular diffusion or phase inversion phenomena), the aforementioned organic phase is pre-gelled for 30 minutes at 40° C. before its use.

Next, the organic phase is transferred at a three-phase injector which allows liquid microballs to be preformed. To do this, an aqueous phase (a so-called phase $W_1$) is injected via a relatively fine capillary having an internal diameter of 150 μm, itself incorporated in a second capillary which will allow injection of the organic phase, which second capillary has an internal diameter of 450 μm. This injection is carried out within a second aqueous phase (a so-called phase $W_2$) comprising 5% by mass of PVA (polyvinyl alcohol), the constant and controlled 45 mL/min flow rate of which allows detachment of microballs with the desired diameter, which ranges from 1,700 μm to 2,300 μm.

Figure 1:
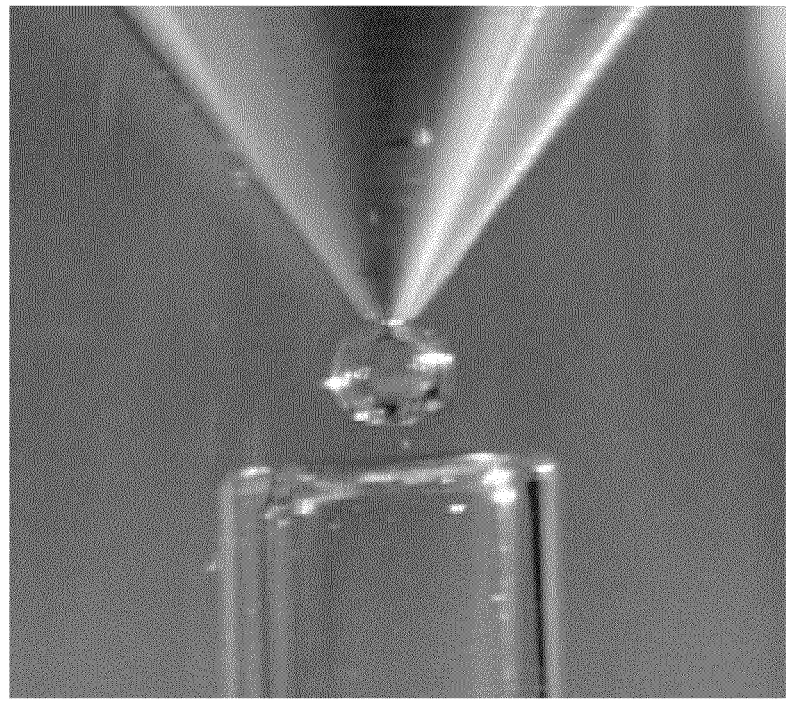
FIG. 1 illustrates an image taken by a CCD camera showing the formation of a liquid microball at the outlet of the three-phase injection system during application of the example mentioned below.

FIG. 1 illustrates the formation of a microball at the outlet of the three-phase injector.

The formed microballs are then placed with horizontal stirring, in order to proceed with the polymerization step via a thermal route (60° C.) for 3 hours under sweeping with nitrogen. By following the same stirring method, they then undergo a series of washings with water, and are then immersed in ethanol in order to remove DPB and the $W_1$ phase.

The microballs are then conditioned in a 10 cm$^3$ vial and then mildly stirred on a roller (15 to 20 revolutions/minute).

Next, the step for saponification of the ester functions of the constitutive polymer of the microballs is carried out in the following way.

The obtained microballs are immersed in an ethanol solution of soda (more specifically in 30 mL of ethanol added with 0.3 mL of 35% aqueous soda) for 5 days in order to saponify the ester functions.

The soda excess is then removed by means of an ethanol/water solution (95/5).

The thereby saponified microballs are then immersed in an ethanol solution of ytterbium triflate (830 mg of (OTf)$_3$ in 30 mL of ethanol) for two days.

Figure 2A:
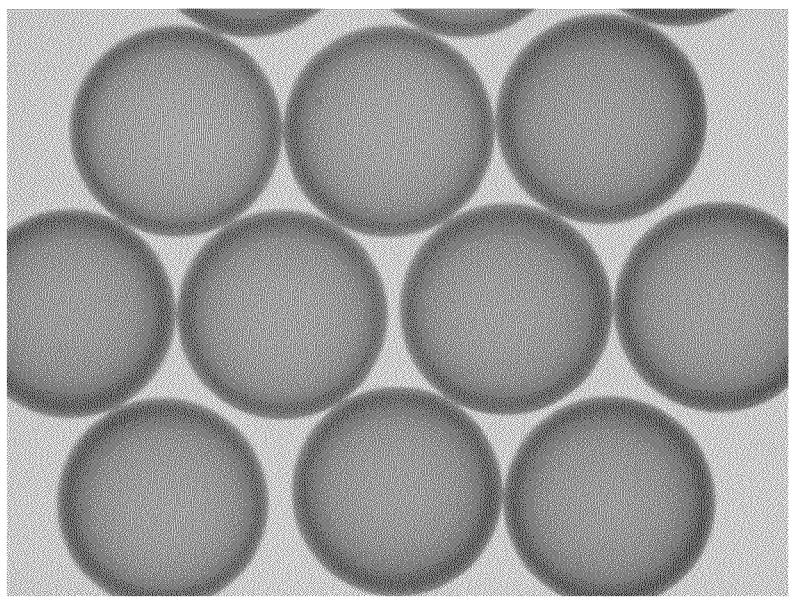
FIGS. 2A and 2B represent photographs of microballs doped with ytterbium obtained during the application of the example mentioned below (the scale of the photograph illustrated in FIG. 2A being smaller than that of FIG. 2B, these photographs were taken before the drying step.
Figure 2B:
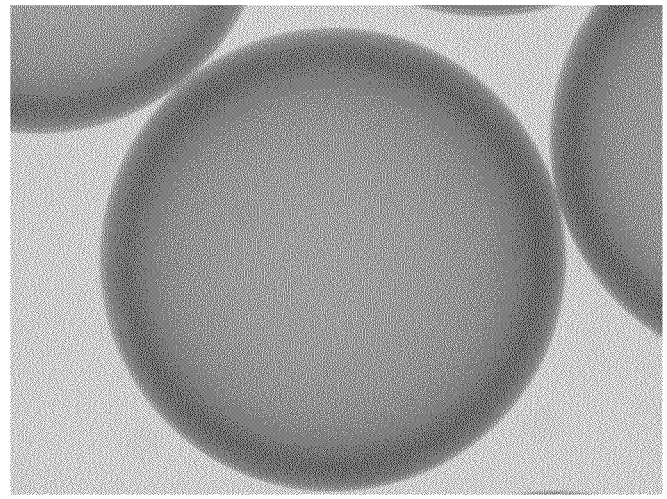

FIGS. 2A and 2B illustrate the obtained microballs for different magnifications.

The microballs doped with ytterbium are then dried with supercritical $CO_2$ at 180 bars at 50° C. The obtained microballs have a specific gravity of about 200 mg/cm$^3$.

Figure 3:
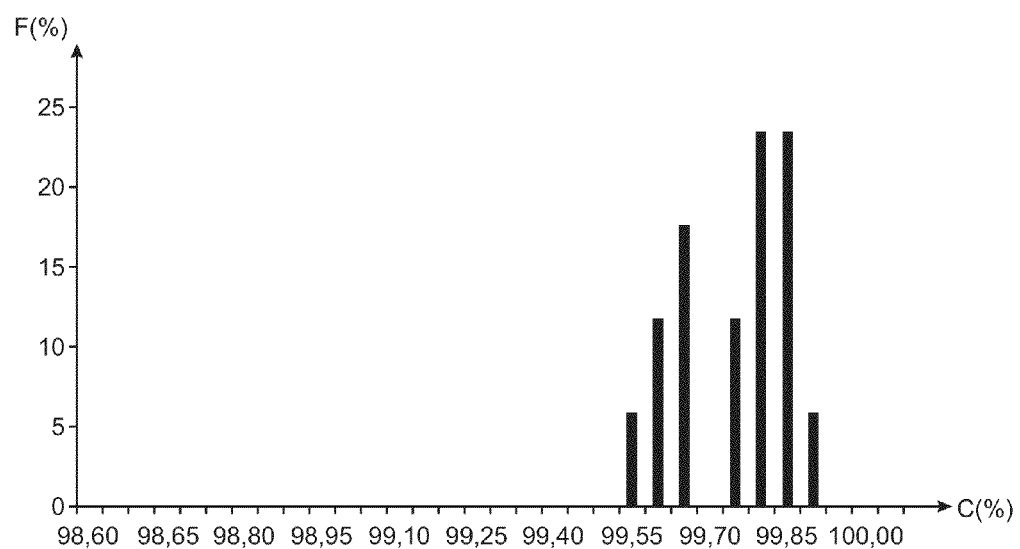
FIG. 3 represents a diagram representing in abscissas the circularity C (in %) and in ordinates the frequency F (in %) of the microballs doped with ytterbium obtained during application of the example mentioned below.

FIG. 3 shows that the microballs obtained have circularity located from 99.55 to 99.85%.

Figure 4:
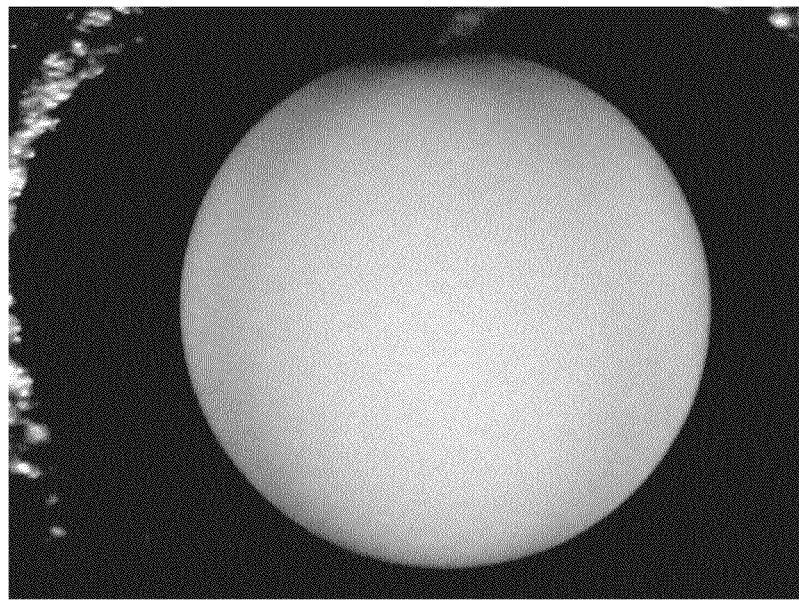
FIG. 4 represents a photograph of a microball doped with ytterbium obtained after drying with supercritical carbon dioxide $CO_2$ according to the example described below.
Figure 5:
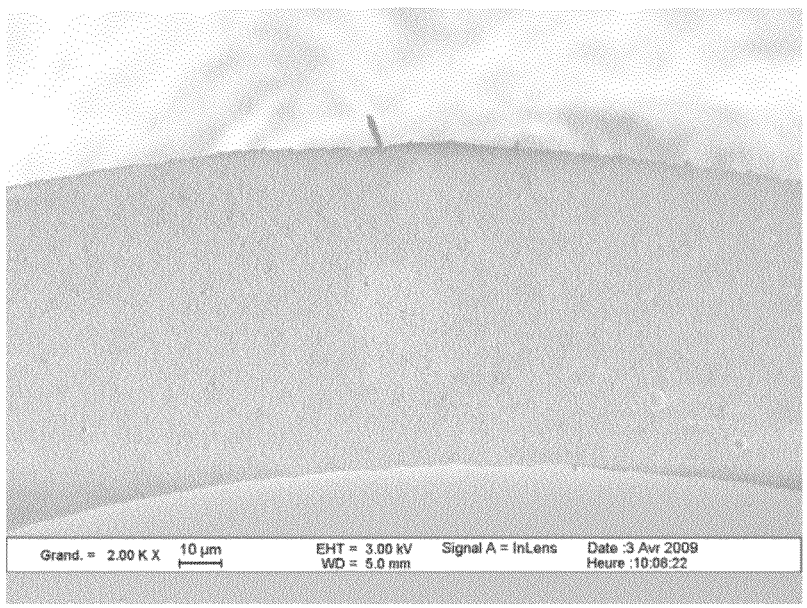
FIG. 5 represents a sectional view obtained by scanning electron microscopy of a microball doped with ytterbium obtained according to the example described below (with a magnification of 2,000).

FIGS. 4 and 5 show a microball obtained according to this example and notably on the sectional view of FIG. 5, good structural homogeneity between the internal and external surfaces and the wall of the microball.

The ytterbium level inserted into the microballs is difficult to evaluate by elementary analysis because of the low mass of the microballs to be characterized (of the order of 150 μg per microball). However, with X fluorescence analysis of made samples, it is possible to estimate the ytterbium doping level as being between 5 and 8% by mass.

What is claimed is:

1. A method for producing polymeric balls doped with at least one metal element, comprising:
   a) forming polymeric balls by polymerization, in an organic phase comprising a polymerization initiator, of at least one ethylenic monomer comprising at least one chelating ligand of at least one metal element; and
   b) putting said polymeric balls in contact with a solution comprising at least one metal element,
   wherein said a) is applied with the succession of the following operations:
      forming liquid balls by encapsulation of a first aqueous phase $W_1$ in an organic phase, this organic phase comprising at least one ethylenic monomer comprising at least one chelating ligand of at least one metal element and at least one polymerization initiator;
      emulsifying in a second aqueous phase $W_2$ the thereby formed balls; and
      polymerizing the constitutive monomer(s) of the organic phase, by means of which polymeric balls are obtained.

2. A method according to claim 1, wherein the ethylenic monomer comprising at least one chelating ligand of at least one metal element is a monomer including at least one group bearing a free doublet and/or at least one negatively charged group.

3. The method according to claim 1, wherein the ethylenic monomer comprising at least one chelating ligand of at least one metal element is a monomer fitting the following formula (I):

wherein:
   R represents a group selected from the groups of the following formulae:

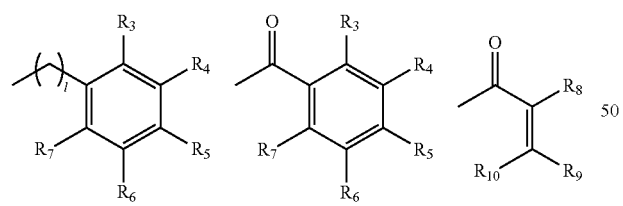

$R_1$ and $R_2$ represent independently H, an alkyl group, an aryl group or a group of the following formulae:

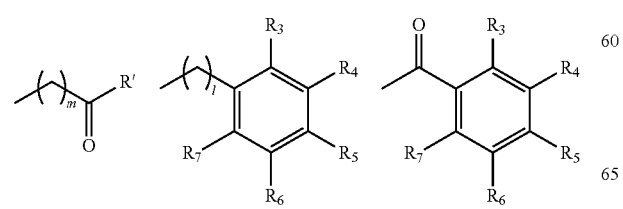

-continued

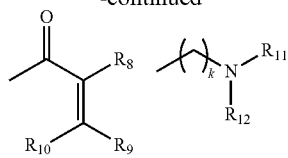

$R_{11}$ and $R_{12}$ corresponding, independently, to groups fitting the same definition as $R_1$ and $R_2$ given above;

R' is an $OR_{13}$ or amine group;

$R_3$, $R_4$, $R_5$, $R_6$, $R_7$, represent independently, H, an ethylenic group, an alkyl group, an aryl group, an —O-aryl group, an —O-alkyl group, an acyl group, an alkylaryl group or a halogen atom, said alkyl, aryl, alkylaryl, —O-aryl, —O-alkyl groups being optionally perfluorinated, wherein one or more oxygen, nitrogen, sulfur and/or selenium atoms may be inserted into said groups, provided that at least one of $R_3$, $R_4$, $R_5$, $R_6$, $R_7$ represents an ethylenic group;

$R_8$, $R_9$ and $R_{10}$ represent, independently, H, an ethylenic group, an alkyl group, an aryl group, an —O-aryl group, an O-alkyl group, an acyl group, an alkylaryl group or a halogen atom, said alkyl, aryl, alkylaryl, —O-aryl, —O-alkyl groups being optionally perfluorinated, wherein one or more oxygen, nitrogen, sulfur and/or selenium atoms may be inserted into said groups;

$R_{13}$ represents H, a metal, an alkyl group, an aryl group, an acyl group or an alkylaryl group, said alkyl, aryl, alkylaryl groups being optionally perfluorinated and wherein one or more oxygen, sulfur and/or selenium atoms may be inserted into said groups;

k, l and m are integers ranging from 0 to 20;

and salts thereof.

4. The method according to claim 3, wherein R is a group of formula:

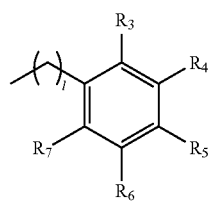

and at least one of $R^1$ and $R^2$ is a group of formula:

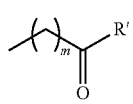

$R_3$ to $R_7$, R', l and m having the same meanings as those stated in claim 3.

5. The method according to claim 3, wherein R is a group of formula:

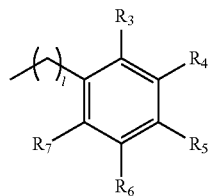

$R_1$ is a group of formula:

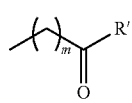

and $R_2$ is a hydrogen atom, $R_3$ to $R_7$, R', l and m having the same meanings as those stated in claim 3.

6. The method according to claim 5, wherein the monomer fits the following formula (II):

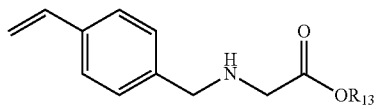

$R_{13}$ representing H, a metal or an alkyl group.

7. The method according to claim 4, wherein R is a group of formula:

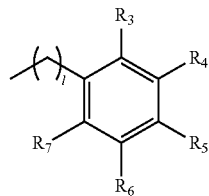

$R_1$ is a group of formula:

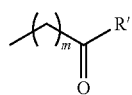

and $R_2$ is a group of formula:

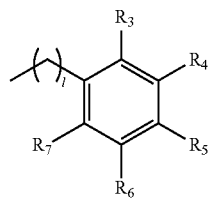

l and m, $R_3$ to $R_7$ and R' having the same meanings as those given in claim 4.

8. The method according to claim 7, wherein the monomer fits the following formula (III):

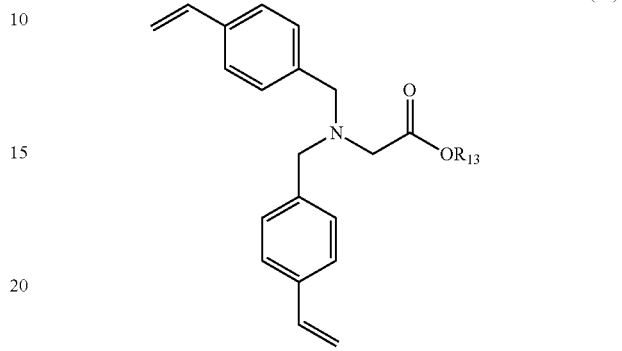

$R_{13}$ representing H, a metal or an alkyl group.

9. The method according to claim 1, wherein the monomer comprises a cyclic amine comprising at least two nitrogen atoms.

10. The method according to claim 9, wherein the monomer fits the following formula (IV):

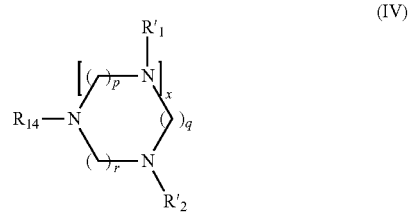

wherein:

$R_{14}$ represents a group selected from the groups of the following formulae:

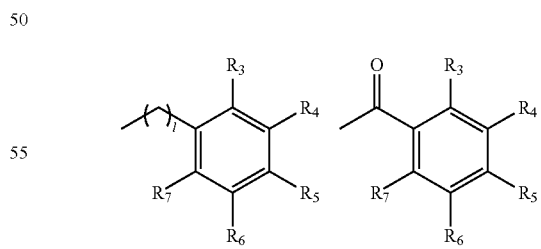

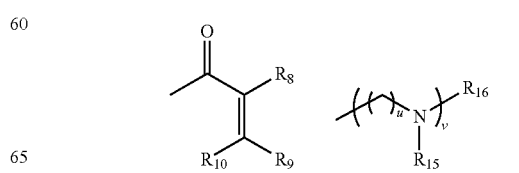

R'$_1$ and R'$_2$ represent, independently, an alkyl group, an aryl group or a group of the following formulae:

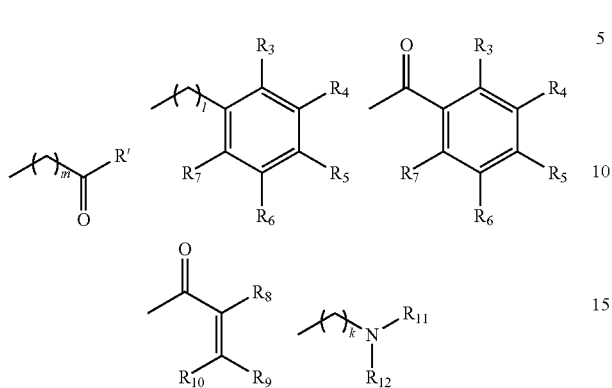

R$_{11}$ and R$_{12}$ corresponding, independently, to groups fitting the same definition as for R'1 and R'2 given above;

R' is an OR13 or amine group;

R$_3$, R$_4$, R$_5$, R$_6$ and R$_7$ represent, independently, H, an ethylenic group, an alkyl group, an aryl group, an —O-aryl group, an —O-alkyl group, an acyl group, an alkylaryl group or a halogen atom, said alkyl, aryl, alkylaryl, —O-aryl, —O-alkyl groups being optionally perfluorinated, wherein one or more oxygen, nitrogen, sulfur and/or selenium atoms may be inserted into said groups, provided that at least one of the R$_3$, R$_4$, R$_5$, R$_6$, R$_7$ represents an ethylenic group;

R$_8$, R$_9$ and R$_{10}$ represent independently H, an ethylenic group, an alkyl group, an aryl group, an —O-aryl group, an —O-alkyl group, an acyl group, an alkylaryl group or a halogen atom, said alkyl, aryl, alkylaryl, —O-aryl, —O-alkyl groups being optionally perfluorinated, wherein one or more oxygen, nitrogen, sulfur and/or selenium atoms may be inserted into said groups;

R$_{15}$ represents a group of the following formulae:

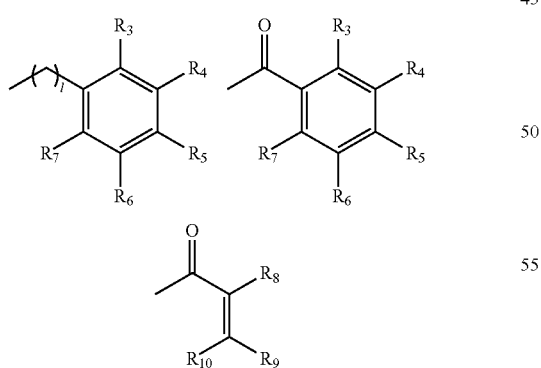

R$_3$ to R$_{10}$ being as defined above;

R$_{13}$ represents H, a metal, an alkyl group, an aryl group, an acyl group or an alkylaryl group, said alkyl, aryl, alkylaryl groups being optionally perfluorinated and wherein one or more oxygen, sulfur and/or selenium atoms may be inserted into said groups;

R$_{16}$ represents a group of formula:

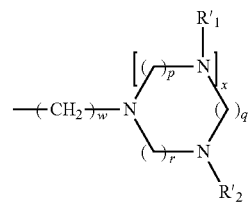

R'$_1$ and R'$_2$ being as defined above;

k, l, m, u, p, q, r, x and w are integers ranging from 0 to 20, v is an integer ranging from 1 to 20, provided that, when x is equal to 0, (r+q) is at least equal to 2, and when x is equal to 1, at least one of p, q, r is different from 0.

11. The method according to claim 10, wherein R$_{14}$ represents a group of the following formula:

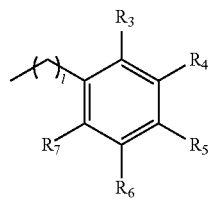

and at least one of R'$_1$ and R'$_2$ represents:

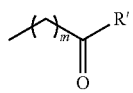

R$_3$ to R$_7$, R', l and m fitting the same definition as the one given in claim 10, p, q, r and x being at least equal to 1.

12. The method according to claim 10, wherein R$_{14}$ is a group of formula:

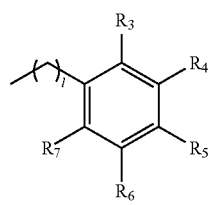

R'$_1$ and R'$_2$ represent a group of formula:

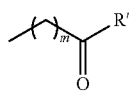

R$_3$ to R$_7$, R', k and m fitting the same definition as the one given in claim 10, p, q, r and x being at least equal to 1.

13. The method according to claim 10, wherein the monomer fits the following formula (V):

(V)

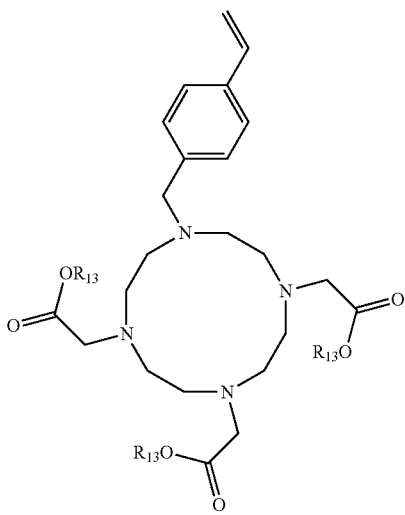

$R_{13}$ representing H, a metal or an alkyl group.

14. The method according to claim 10, wherein $R_{14}$ represents a group of formula:

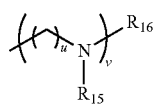

and at least one of $R'_1$ and $R'_2$ represents:

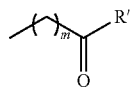

$R_{15}$, $R_{16}$, R', m, u and v fitting the same definitions as those given in claim 10, p, q, r and x being at least equal to 1.

15. The method according to claim 1, wherein the metal element is selected from alkaline metals, earth alkaline metals, transition metals, lanthanides, actinides as well as the elements Al, Ga, Ge, In, Sn, Sb, Tl, Pb, Bi or Po.

16. The method according to claim 15, wherein the metal element is a lanthanide element, such as ytterbium.

17. The method according to claim 1, wherein said polymerization is carried out in the presence of one or several comonomers different from the monomer defined according to claim 1.

18. The method according to claim 17, wherein the comonomer(s) is(are) selected from styrenic monomers and acrylate monomers.

19. The method according to claim 17, wherein the comonomer(s) comprise(s) at least two ethylenic groups.

20. The method according to claim 18, wherein the comonomer(s) fit(s) one of the following formulae (VII) or (VIII):

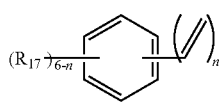 (VII)

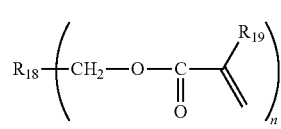 (VIII)

wherein the (6-n) $R_{17}$, either identical or different, represent a hydrogen atom, an alkyl group, an aryl group, an —O-aryl group, an —O-alkyl group, an acyl group, an alkylaryl group or a halogen atom, said alkyl, aryl, alkylaryl, —O-aryl, —O-alkyl groups being optionally perfluorinated, $R_{18}$ represents an alkyl group, $R_{19}$ represents H or an alkyl group and n being an integer ranging from 1 to 3.

21. The method according to claim 20, wherein the comonomer is divinylbenzene.

22. The method according to claim 1, wherein said a) takes place in the presence of a monomer of the following formula (III):

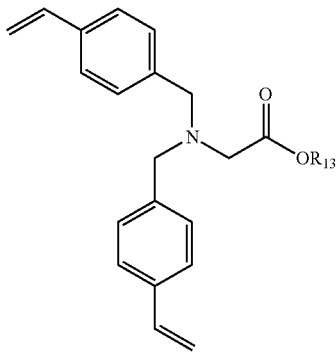 (III)

$R_{13}$ representing H, a metal or an alkyl group and divinylbenzene and styrene.

* * * * *